Figure 1:
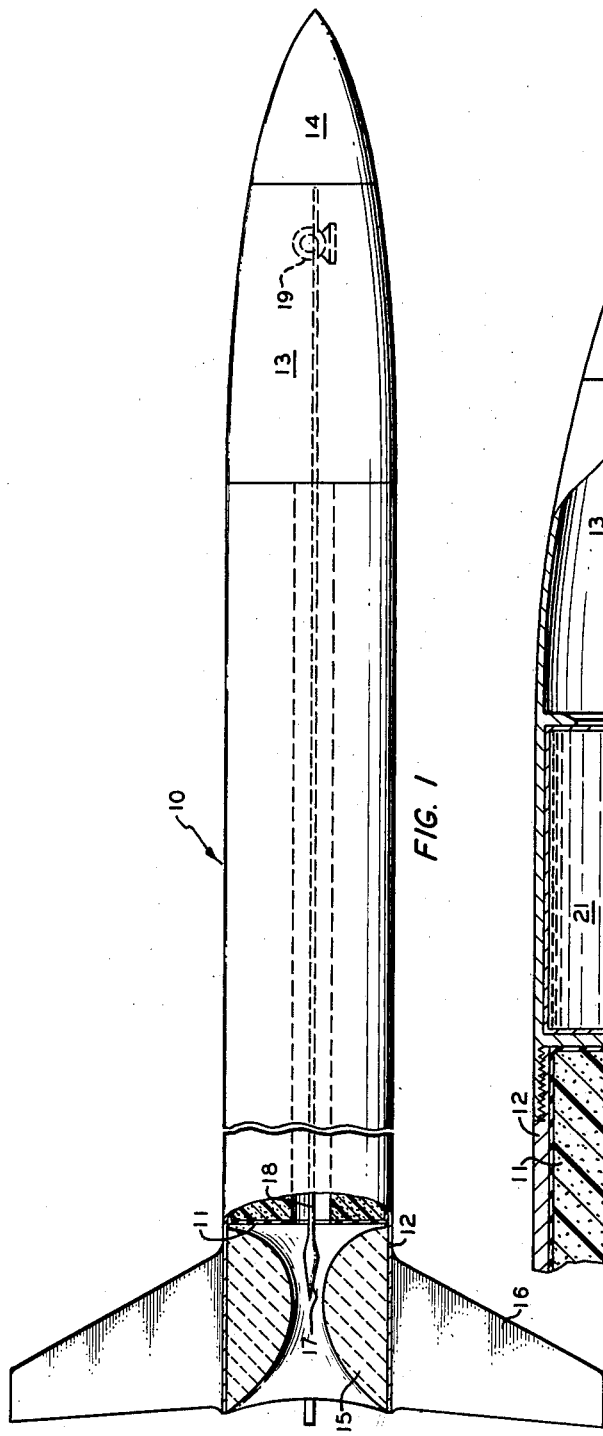

April 14, 1964     D. E. CARR     3,128,599
SOLID-FLUID ROCKET PROPELLANT SYSTEM
Filed Oct. 6, 1958

INVENTOR.
D. E. CARR
BY Hudson and Young
ATTORNEYS

United States Patent Office 3,128,599
Patented Apr. 14, 1964

3,128,599
SOLID-FLUID ROCKET PROPELLANT SYSTEM
Donald E. Carr, Bartlesville, Okla., assignor to Phillips Petroleum Company, a corporation of Delaware
Filed Oct. 6, 1958, Ser. No. 765,674
4 Claims. (Cl. 60—35.6)

This invention relates to a rocket motor and more particularly to an improved hybrid rocket motor wherein a fluid propellant and a solid propellant are used simultaneously to obtain a predetermined flight pattern. In one aspect this invention relates to an improved hybrid rocket motor wherein the performance characteristics of the motor are automatically controlled to accomplish a desired and predetermined result.

It is known to operate a rocket motor with a solid propellant charge and to augment the solid propellant with a source of fluid fuel or oxidizer to supply a deficiency of the solid propellant. These rocket motors are generally referred to as hybrid rocket motors. The principal purpose of a hybrid rocket motor is to provide a means for controlling the ratio of fuel to oxidizer present in a solid propellant-containing combustion zone so that the burning rate can be set at a desired and useful level. For maximum performance control of a hybrid rocket, this presupposes that the solid propellant will be deficient in either oxidizer or fuel and that the fluid will supply the component in which the solid propellant is deficient. Thus the fuel-oxidizer ratio in the combustion zone can be operated fuel-rich, oxidizer-rich, or stoichiometric as the occasion requires. The solid charge can be deficient in fuel or oxidizer only to the extent that maximum combustion efficiency is not attained by the solid charge alone or can be deficient in fuel or oxidizer to the extent that the solid charge will not provide sustained combustion in the absence of the augmenting fluid.

The present invention provides a method and means for regulating the burning rate of a hybrid rocket motor combustion system and therefore controlling the performance characteristics of the motor by controlling the amount of fluid supplied to the solid propellant charge in the combustion zone.

It is therefore a principal object of this invention to provide an improved hybrid rocket motor wherein the performance characteristics of the motor can be operated according to a predetermined schedule.

It is another object of this invention to provide a means for controlling the burning rate of a hybrid rocket motor according to a predetermined plan.

It is also an object of this invention to provide a means for controlling the pressure in the combustion zone of a hybrid rocket motor to follow a predetermined program.

A further object of the invention is the provision of a method for termination of thrust of a hybrid rocket motor.

Other and further objects and advantages of this invention will be apparent to one skilled in the art upon study of this disclosure including the detailed description and the drawing.

Figure 2:
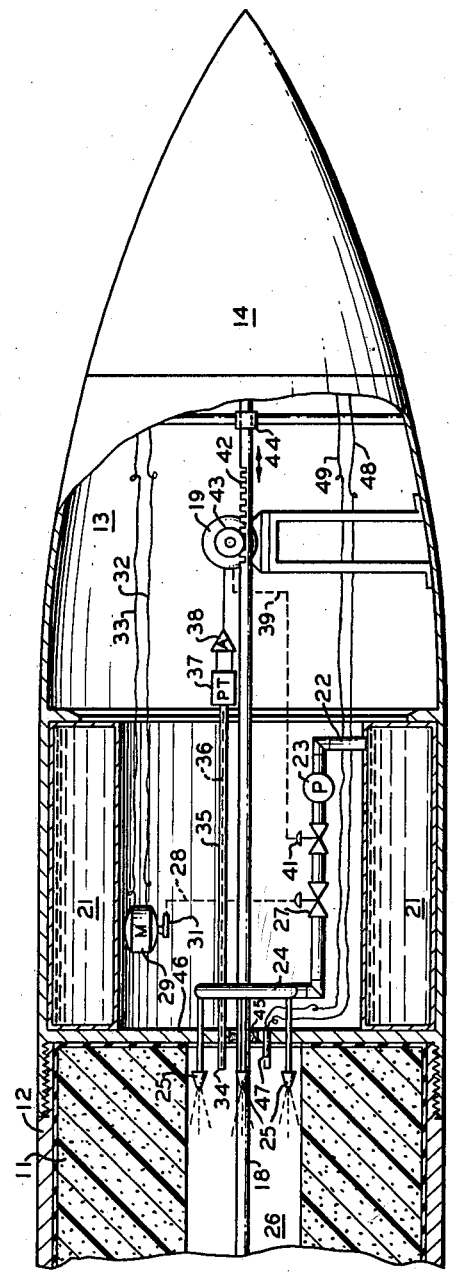

FIGURE 1 is an elevational view, partly in section, of an embodiment of the invention; and
FIGURE 2 is a detailed sectional elevation of a preferred embodiment of the invention.

Reference is now made to the drawings wherein like numerals refer to like elements in the figures of the drawing. FIGURE 1 represents a view of a rocket motor 10 containing a perforated, solid propellant charge 11 positioned in motor case 12, a control section 13, forward section 14, nozzle 15, and guide fins 16. Nozzle area controller cone 17 is positioned adjacent nozzle 15 so as to regulate the area of nozzle 15 and is actuated by means of shaft 18 and motor 19. Section 14 can be the payload of the rocket or can be the next stage of a multistage rocket.

In FIGURE 2 I have shown a schematic view of the control section 13 of a hybrid rocket motor wherein, for purpose of illustration, 11 represents a solid propellant deficient in fuel and 21 represents a fluid tank containing a liquid fuel such as gasoline or kerosene. Tank 21 is shown as an annular tank occupying the periphery of that portion of control section 13. Liquid fuel is supplied from tank 21 via conduit 22, pump 23, manifold 24 and nozzles 25 to combustion chamber 26. The nozzles 25 direct the fluid to the surface of the propellant charge. The flow of fluid through conduit 22 is controlled principally by motor valve 27 which is actuated through mechanical linkage 28 by motor 29 and cam 31. Motor 29 is connected by leads 32 and 33 to a source of energy (not shown) and preferably operates at constant speed so that the opening of motor valve 27 can be accomplished according to a predetermined plan according to the configuration of cam 31.

The performance of the rocket motor will depend upon the rate at which combustion progresses in combustion zone 26 and this combustion rate, in turn, will depend upon the presusre in combustion chamber 26 and upon the rate at which fluid from tank 21 is fed to the combustion chamber. Pressure sensitive element 34 which can be a diaphragm closing the end of tube 35, transmits a signal indicative of the pressure in chamber 26 by means of mechanical linkage 36 to pressure transducer 37.

The pressure transducer, referred to herein, is a device for electrically measuring mechanical motions and transmitting such measurements in the form of an electrical signal. When an alternating current is transmitted, the device is essentially a differential transformer with a linear response. Such a device is described in "Principles and Methods of Telemetering" by Perry A. Borden, Reinhold Publishing Corporation, New York (1948), at page 160 et seq. A similar device is described in U.S. Patent No. 2,568,587 (1952), to W. D. MacGeorge. When direct current is to be transmitted, a device is used which utilizes the principal of the Wheatstone bridge. A device of this nature is described in the above-mentioned "Principles and Methods of Telemetering" at page 56 et seq. and illustrated in FIGURE 22 on page 55. Such devices are known to the art and are available in a variety of forms.

Pressure transducer 37 develops a voltage which is proportional to the pressure in combustion chamber 26 and this signal is amplified in amplifier 38 and applied to servo motor 19.

Servo motor 19 is a reversible motor and is connected by means of mechanical linkage 39 to motor valve 41 so as to close, or partly close, motor valve 41 when the pressure in combustion chamber 26 exceeds a certain value. Servo motor 19 is also operatively connected to shaft 18 by means of rack 42 and pinion 43 so as to actuate shaft 18 to withdraw cone 17 from nozzle 15. Shaft 18 is maintained in alignment with the throat of exhaust nozzle 15 by means of guide 44 and packing gland 45. Packing gland 45 provides a stuffing box for passage of shaft 18 through bulkhead 46 to prevent leakage of gases from combustion chamber 26 into control section 13. Ignition of the propellant is obtained by means of sparking plug 47 connected by means of leads 48 and 49 to a source of electrical energy (not shown).

In case the solid propellant 11 is incapable of sustaining combustion without the addition of fluid from tank 21, thrust can be terminated by terminating the supply of fluid by stopping pump 23 or causing motor 29 to place cam 31 in a position such that motor valve 27 is closed.

Combustion can also be terminated by flooding the combustion chamber with the liquid which comprises the fluid component of the hybrid rocket system. In this manner combustion is smothered by the excess of the fluid component and the burning surface of the propellant charge is cooled to below the autoignition temperature.

In a modification of the invention the shaft 18 can comprise a hollow tube for at least a part of its length with a plurality of perforations or nozzles around its periphery within the combustion chamber so that the fluid from tank 21 can be sprayed over substantially all of the burning surface of the solid charge. Conduit 22 can be joined to the hollow portion of shaft 18 by means of a loop in conduit 22 to provide sufficient flexibility to allow longitudinal movement of shaft 18. A bellows or other expansible means can also be incorporated in conduit 22 to provide flexibility.

The solid propellant can be an oxidizer-rich solid such as pressed ammonium nitrate or pressed ammonium chlorate, with or without a nonflammable binder such as polytetrafluoroethylene; in which case the augmenting fluid propellant will be a fuel component such as gasoline, kerosene, any of the known jet fuel compositions, or other liquid hydrocarbons suitable as a fuel when combined with a source of oxygen.

The solid propellant can be a fuel-rich solid such as a mixture of a solid oxidizer such as ammonium nitrate or ammonium perchlorate together with a rubbery binder material such as a copolymer of a conjugated diene and a heterocyclic nitrogen base, as described in copending application Serial No. 502,154, filed April 18, 1955, now Patent No. 3,068,641. Other fuel-rich solid propellants include ammonium nitrate with an asphalt binder; ammonium nitrate or ammonium perchlorate with various binder materials such as polysulfide rubber, polyvinylchloride, and the like; and nitroguanidine, sodium nitrate or potassium nitrate with suitable binding materials such as those set forth above. Other fuel-rich solid propellants include a pressed charge of an organic nitrate or an organic perchlorate such as diisopropylamine nitrate; diisopropylamine perchlorate; or N,N,N',N'-tetramethylbutane-1,3-diaminedinitrate. The fuel-rich solid propellant charge also can be a high energy material such as a boron-perchlorate charge. The fluid component for use with the fuel-rich solid propellants will be an oxygen-containing fluid such as nitric acid, hydrogen peroxide, liquid oxygen, and the like.

It will be appreciated by those skilled in the art that materials which are subjected to the high temperatures of the burning propellants will be constructed of materials capable of withstanding such temperatures or will be adequately insulated. Restrictor materials used to control the burning area of the solid propellant will usually provide sufficient insulation to ordinary metals used for construction of rocket elements.

The flight performance of a rocket motor having incorporated therein the control system of this invention will be dictated by the configuration of the cam 31 and the maximum operating combustion chamber pressure allowed by the position of motor valve 41.

Assume, for purpose of illustration, a flight program wherein it is desired to attain maximum thrust and maximum efficiency of the propellant in initiating the flight and accelerating the rocket for a definite time after which it is desired that the rocket continue in level flight so that maximum thrust is not required for the remainder of the flight program. In initiating such program, motor 29 will operate cam 31 so as to open motor valve 27 so as to obtain maximum temperature and maximum pressure in combustion chamber 26 so as to provide maximum thrust of the rocket motor. In the event that the pressure increases past a predetermined maximum value, motor valve 41 will be throttled to reduce the amount of fluid supplied to the combustion chamber and thereby reduce the pressure in the combustion chamber. Motor 29 will ordinarily be operated at a constant speed and at a predetermined stage in the program the configuration of cam 31 will be such that the opening of valve 27 will be reduced so that the combustion in combustion chamber 26 will be at some value below its maximum efficiency and the pressure in combustion zone 26 will thereby be reduced. In response to the reduction in pressure in combustion chamber 26, motor 19, acting in response to the signal received from pressure transducer 37 and amplifier 38, manipulates shaft 18 so as to advance cone 17 into the throat of exhaust nozzle 15 and thereby increase the pressure in combustion chamber 26 so that, although the total thrust of the rocket motor is reduced, the characteristic exhaust velocity of the gases passing through nozzle 15 remains substantially the same and the efficiency of the rocket motor is attained although the level of thrust is reduced. Valve 41 and cone 17, when manipulated by motor 19, cooperate to maintain the pressure in the combustion chamber within a predetermined safe and useful range.

The flight program used as an illustrative example represents one of innumerable programs or schedules which can be predetermined by the configuration of cam 31. It will be appreciated by those skilled in the art that cam 31 provides a simple and reliable means for staging the burning rate of the propellant but that equivalent means can be substituted therefor.

Variations and modifications are possible within the scope of the present disclosure without departing from the spirit and scope of the invention.

That which is claimed is:

1. In combination in a rocket motor comprising a combustion chamber, an exhaust nozzle, a combustible solid charge in said combustion chamber, and a supply of combustion supporting fluid, apparatus to control the flight of the rocket according to a predetermined flight plan at controlled combustion chamber pressure comprising means to introduce said fluid to the charge in said combustion chamber in varying quantities according to a predetermined schedule comprising a constant speed motor; a cam having a configuration corresponding to the predetermined flight plan operatively connected to said motor and to said means to introduce fluid to said charge; means to limit the amount of fluid passed to the charge so as to maintain the pressure in the combustion chamber below a predetermined maximum value; and means to reduce the exhaust nozzle area to maintain the combustion chamber pressure above a predetermined minimum value.

2. A rocket motor comprising a combustion chamber; an exhaust nozzle; a perforated combustible solid charge positioned in said combustion chamber; a combustion supporting fluid supply chamber positioned in said motor forward from and separated from said combustion chamber; nozzle means positioned in said combustion chamber; conduit means connecting said nozzle means and said fluid supply chamber; means for applying sufficient pressure to said fluid to supply same to said combustion chamber; a first valve in said conduit; means comprising a cam operated at constant speed and having a configuration corresponding to a predetermined program operatively connected to said first valve to open and to close said first valve predetermined amounts at predetermined time intervals; a second valve in said conduit; a pressure sensitive means communicating with the interior of said combustion chamber and operatively connected to said second valve so as to close said valve when the pressure in the combustion chamber reaches a predetermined maximum value; means associated with said exhaust nozzle to reduce the effective area of said nozzle and operatively connected with said pressure sensitive means so as to reduce the area of said nozzle when the pressure in said combustion chamber reaches a predetermined minimum value; and means to ignite said combustible charge.

3. In combination in a rocket motor comprising a combustion chamber, an exhaust nozzle, a combustible solid charge in said combustion chamber, and a supply of combustion supporting fluid, apparatus for programming the flight of the rocket comprising means communicating with said combustion chamber and said fluid supply to introduce fluid into said combustion chamber; and control means comprising a constant speed motor; a cam operatively connected to said motor and operatively connected to said fluid supply means so as to introduce said fluid to the charge in said combustion chamber according to a predetermined schedule so as to vary the burning rate of the charge at predetermined time intervals and to terminate combustion according to the configuration of said cam.

4. A rocket adapted to conform automatically to a predetermined flight plan comprising, in combination, a combustion chamber; an exhaust nozzle; a forward section separated from said combustion chamber; a longitudinally perforated charge of solid inorganic oxidizer positioned in said combustion chamber; liquid fuel supply chamber positioned in said forward section; a plurality of nozzle means positioned in said combustion chamber to direct fuel to the surface of said solid charge; conduit means connecting said nozzle means and said fuel supply chamber; a first valve in said conduit; a constant speed motor positioned in said forward section; a cam having a configuration corresponding to the predetermined flight plan, operatively connected to said motor and said first valve to open said valve and to decrease and increase the opening of said valve according to the configuration of the cam; a pressure sensitive means positioned in said combustion chamber; pressure control means comprising a pressure transducer, amplifier and servo motor positioned in said forward section; a second valve in said conduit operatively connected to said pressure control means to throttle said second valve when the pressure in the combustion chamber reaches a predetermined maximum value; means to reduce the effective area of said nozzle operatively connected to said pressure control means so as to reduce the effective area of said nozzle when the pressure in said combustion chamber reaches a predetermined minimum value; and means to ignite said charge.

References Cited in the file of this patent
UNITED STATES PATENTS

| | | |
|---|---|---|
| 2,780,914 | Ring | Feb. 21, 1957 |
| 2,791,883 | Moore et al. | May 4, 1957 |
| 2,814,929 | Morley et al. | Dec. 3, 1957 |